United States Patent [19]
Heard et al.

[11] 3,765,018
[45] Oct. 9, 1973

[54] DIGITAL SCAN CONVERTER

[75] Inventors: James L. Heard, Torrance; Eugene W. Opittek, Tustin; Harold M. Meyers, deceased, late of Torrance, all of Calif. by Mary Elizabeth Meyers, executrix

[73] Assignee: Hughes Aircraft Company, Culver City, Calif., by said Heard and said Opittek.

[22] Filed: June 2, 1972

[21] Appl. No.: 260,023

[52] U.S. Cl. .............................. 343/5 SC, 343/5 DP
[51] Int. Cl. ................................................ G01s 7/04
[58] Field of Search ....................... 343/5 DP, 5 SC

[56] References Cited
UNITED STATES PATENTS
| | | | |
|---|---|---|---|
| 3,218,637 | 11/1965 | Balding | 343/5 SC |
| 3,631,483 | 12/1971 | Ruggles et al. | 343/5 SC |
| 3,633,173 | 1/1972 | Edge | 343/5 SC X |
| 3,683,373 | 8/1972 | Barnes et al. | 343/5 DP |

*Primary Examiner*—T. H. Tubbesing
*Attorney*—W. H. MacAllister et al.

[57] ABSTRACT

There is disclosed a visual scan converter which accepts digitalized video data available from a source such as a radar receiver in any given scan pattern such as a PPI format at slow radar rates and converts the data format to make it suitable for presentation on a cathode ray tube in a standard television or other orthogonal raster at flicker free rates. Greater flexibility and economy than has heretofor been available in digital scan converters is achieved by using a random access memory. Conversion of the video data format is achieved by generating loading addresses for putting the data into memory which are representative of the functional relationship between the scan pattern at which the data was derived and that at which it is intended to be displayed. A simple counter may then be used to orthogonally address the random access memory for readout at any desired rate.

8 Claims, 5 Drawing Figures

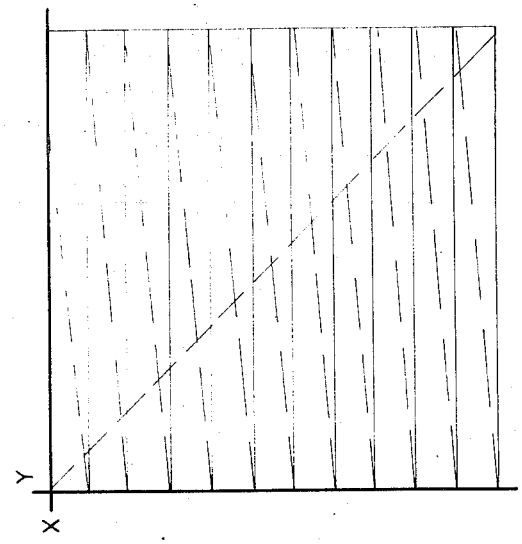
Fig. 1. P.P.I. Scan Format
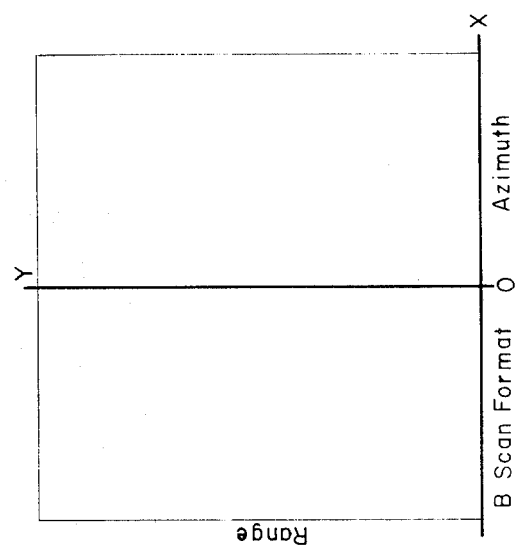
Fig. 2. B Scan Format
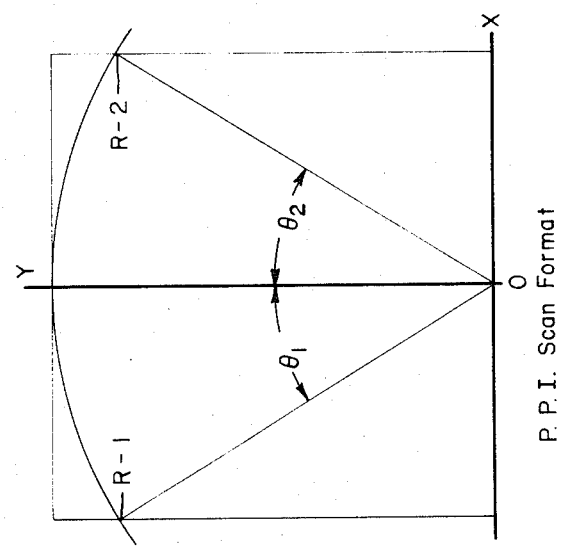
Fig. 3. CRT Display Raster

DIGITAL SCAN CONVERTER

BACKGROUND AND RELATED APPLICATION

This invention relates to apparatus for conversion of video data which is available from a radar receiver or other source at one particular scan rate and must be displayed at a different scan rate. More particularly, this invention relates to an improved digital scan converter of the type disclosed in copending U.S. Patent Application Ser. No. 880,630, entitled "Digital Scan Converter" and assigned to the same assignee as this application.

The basic requirement of any scan converter is to accept video data as it becomes available at one particular rate and to display the data at a different rate. Analog storage tubes have been used for conversion of slow data rates, such as radar scan data rates, to high data rates, such as those used for flicker-free television or other orthogonal display scans. The analog technique is to store a charge pattern at the sensor scan rate on a dielectric mesh of a cathode ray tube, and to use the charged dielectric mesh to modulate a read beam scanned at a higher rate in the proper format for display on a second cathode ray tube. The modulated read beam develops a video signal in a collector mesh, and this video signal is used to modulate the electron beam of the display tube as that beam is scanned in synchronism with the read beam of the scan converter tube.

In the digital scan converter of the above-noted copending application, no dielectric mesh is used, but rather there is provided a sufficiently large bulk storage memory so that video data stored therein in one format or sequence of addresses may be read in a different format for display. A buffer memory may be provided at the input of the bulk storage memory in order to receive video return signals through an analog-to-digital signal converter and store accumulated memory data in digital form in the bulk storage memory.

The buffer memory may be provided with sensor data coordinates in order that the quantized video data may be accumulated for transfer into the bulk storage memory in block form such as all data pertaining to a particular point on the axis, all the abscissas for a rectangular coordinate system of scanning, or all data pertaining to a particular angle for a polar coordinate system of scanning. The data thus stored in the bulk storage memory may be serially read for display in blocks, each block pertaining to one line of display which may correspond to a line scanned along the ordinate axis of a rectalinear scanning system, or to a vector of a polar coordinate scanning system.

The data read from the bulk storage memory need not be in the order in which it was developed through the scanning sensor. Instead, it may be read in any desired order such as in two fields, a first field consisting of successive odd numbered blocks pertaining to odd numbered scan lines, and a second field consisting of even numbered blocks pertaining to even numbered scan lines for interlaced display. In its broadest aspect, the buffer and bulk storage memories may be combined into one storage memory such that the input line data is stored therein directly with the data elements from a given line stored in the order in which read as the storage memory is cyclically read, or in an order effectively orthogonal thereto such that all corresponding elements of all lines are read in sequence for display in one line orthogonal to the direction in which a line block of data is displayed in a display frame. In either case, a line block of data need not include a data element for each video return. Instead, a predetermined number of data elements may be averaged for storage and display as a single element of data. Similarly, a line block of data need not be stored for each line scanned. Instead, a predetermined number of line blocks of data may be averaged for storage and display as a single element. In all of the detailed mechanizations of these functions provided in the apparatus of the above copending application, however, the memories used are of the serial type rather than the random access of orthogonal type.

SUMMARY OF THE INVENTION

It is an object of the present invention to provide a digital scan converter of the type disclosed in the above-noted copending application wherein greater conversion flexibility is more economically achieved by using a random access type of bulk memory for storage of the digital video data. Such a memory is provided in order to convert video data in a scan pattern such as radar type sector PPI format to a horizontal orthogonal display raster such as a television type raster in which horizontal interlaced sweeps are used and are separated by a finite flyback interval, or to any other desired form of orthogonal scan.

The use of a random access rather than a serially accessed memory permits the use of a standard sequential counter for addressing the memory during readout and thereby simplifies the system. Format conversion is achieved by proper addressing of the memory during loading.

The random access memory must be multiplexed or time shared between the readout and loading process. Also, since a flicker-free display is required, readout is continuous such that all of the data may be read out in one-thirtieth of a second. Since an orthogonal addressing scheme is used for data readout, input address having X and Y components must be generated and used during the loading period. In order to accept data originated in the PPI format, the load address is more complex than a simple sequential progression and therefore cannot be generated from a simple counter. The preferred technique described herein is digital in nature. Radial sweep signals are generated in synchronism with the loading of the input data. These sweeps are sampled and digitally multiplied by trigonometric functions stored in a read only memory to provide the memory load addresses. Since a random access memory is used, the address bits can be broken into an X and a Y component. The displayed resolution in each of the orthogonal directions is related to the number of bits in its address component by a factor of $2^N$ where N is the number of bits in that address component. During readout a sequential counter is then used to read the video value at such address sequentially in accordance with the desired display raster pattern.

BRIEF DESCRIPTION OF THE DRAWING

FIG. 1 illustrates a radar-type sector PPI format of a received signal compared to an orthogonal memory format.

FIG. 2 illustrates a radar type B-scan format of a received signal compared to an orthogonal memory format.

FIG. 3 illustrates a horizontal orthogonal raster format of the TV type to which signals received in the format of FIGS. 1 or 2 are to be converted.

DESCRIPTION OF THE PREFERRED EMBODIMENT

Figure 4:
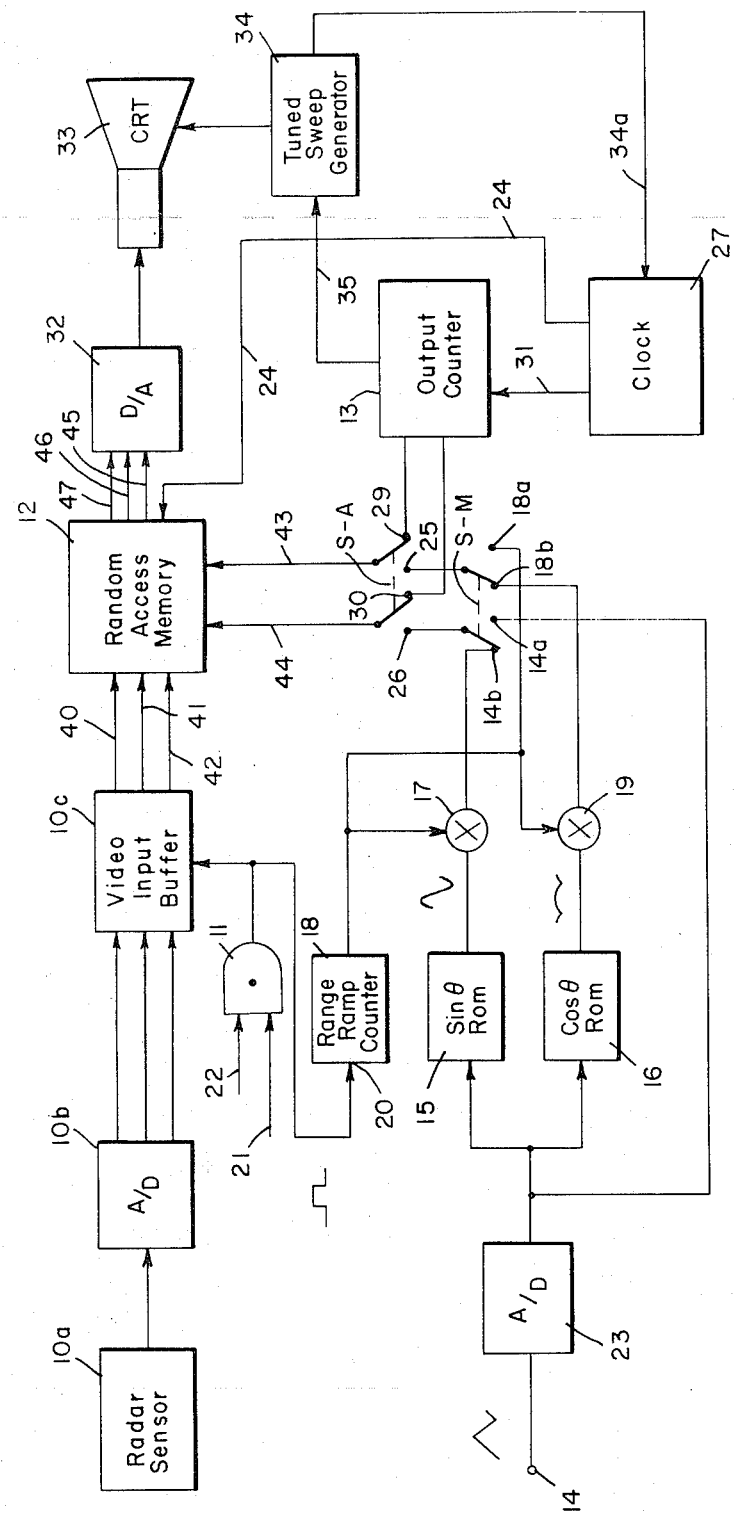
FIG. 4 is a block diagram of one system for converting signals received in the format of FIGS. 1 or 2 to the format of FIG. 3.

The digital scan converter of this invention is intended for use in a system of the general type disclosed in the above noted copending application Ser. No. 880,630. As described therein, a tactical lightweight avionics system comprises a radar sensor having an antenna and a transceiver, display systems and a computer. The display system contains the digital scan converter unit and the radar indicator. In FIG. 4 herein the corresponding radar sensor is shown at 10a supplying video data in either PPI or B scan format switch selectable modes to an analog-to-digital converter 10b, the output of which is fed to the input of buffer memory 10c which is the input stage of the scan converter of this invention.

In operation, the scan converter takes the radar video signals which have been converted to digital signals, and stores them in a metal-oxide-semiconductor random access memory 12 so that they may be read out under control of counter 13 in a time sequence compatible with the scanning of a standard TV display or other orthogonal raster to be displayed on CRT 33. The address used in writing each input video word in memory 12 determines the position in which it will appear on the indicator cathode ray tube 33 since readout is accomplished by means of the simple counter 13. The addressing is therefore programmed according to the radar scan mode selected, using the radar master trigger, and internal clock, and the antenna azimuth signal. TV synch signals are then added to provide a standard composite TV-video signal for the indicator.

Figure 5:
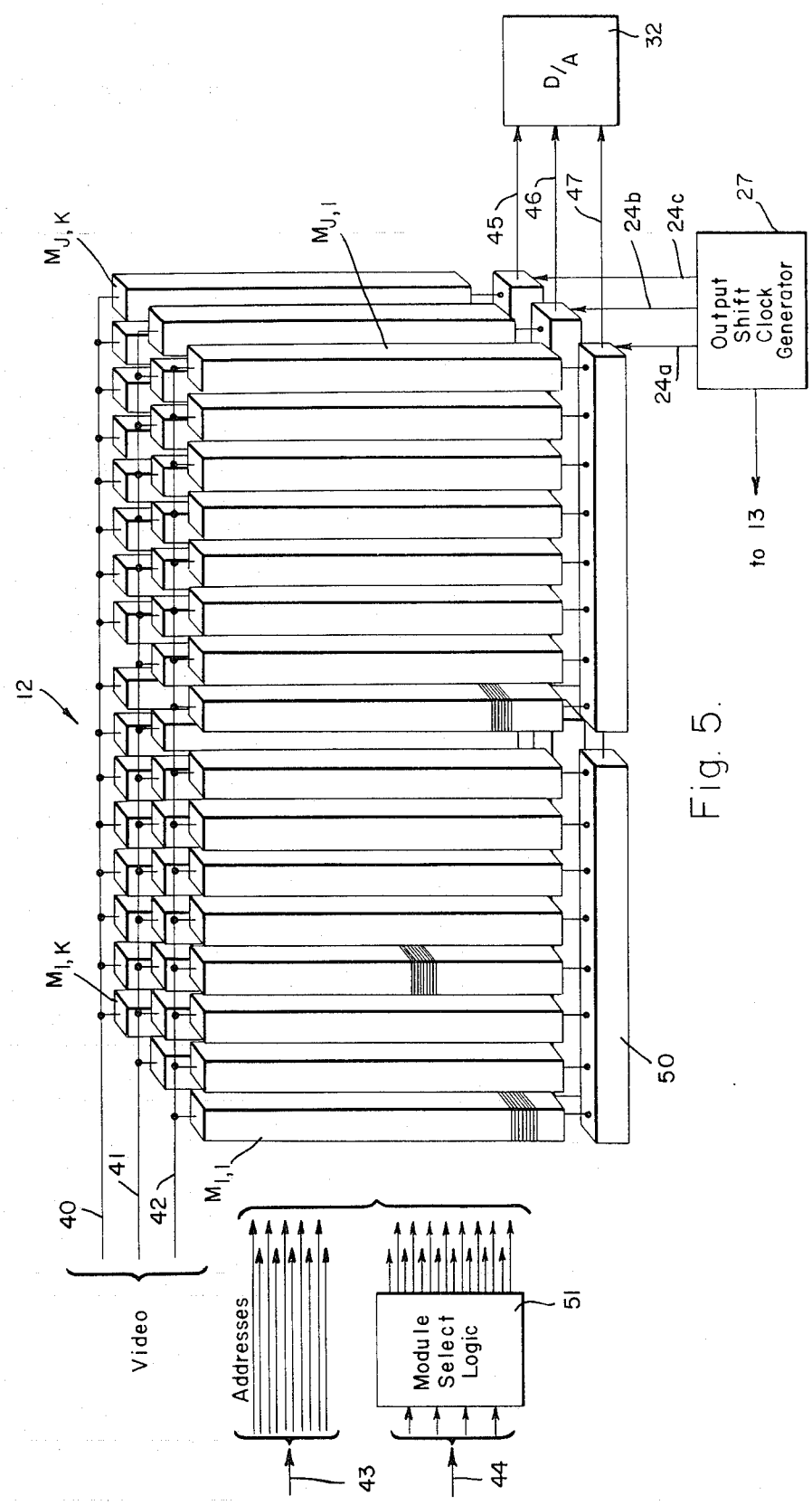
FIG. 5 is a detailed diagrammatic illustration of the functional organization of the random access memory.

The digital scan converter provides a means of converting the format of the slow scan radar video to a high speed TV-type raster. The radar video is analog-to-digital converted and shifted element-by-element into metal-oxide-semiconductor shift registers which make up the input buffer 10c. If desired, buffer 10c may include an integrator which integrates up a number of successive range sweeps thereby improving the system signal-to-noise ratio. The timing of the input analog-to-digital and video integrator is synchronized with the pulse repetition frequency pulse and the shift rate is inversely proportional to the range selected. The memory required for the particular radar scan conversion application disclosed herein by way of preferred example must be capable of storing digital information three bits of video intensity coding for each picture element in the scan format in which the video information is derived. The memory 12 may, for example, be composed of 48 random access metal-oxide-semiconductor memory modules (as shown in FIG. 5) each having an N × 1 bit capacity, where N is a design parameter. The antenna azimuth signal is applied to terminal 14 and analog-to-digital converted at 23 as shown in FIG. 4, thereby providing a portion of the memory load address. A sequential range counter 18 provides the balance of the load address. This address is used directly in the B scan mode. Its two components are available as determined by mode switch selector S-M at terminals 14a and 18a. In the PPI mode these addresses are multiplied by the sine and cosine of the antenna azimuth to provide addresses in a radial order. These PPI addresses are made available at terminals 14b and 18b of the above noted scan mode selector switch S-M. The memory output addressing is achieved by binary counter 13 and is multiplexed in either scan mode with the loading addressing by any convenient electronic multiplexer symbolically represented in FIG. 4 by address switch S-A. The display sweep synch pulses are generated in synchronism with this output address counter. The output digital video is digital-to-analog converted at 32 and mixed with the horizontal and vertical synch pulses resulting in standard composite TV-video.

The manner in which this mode of operation is achieved may be seen in greater detail by reference to the drawings in which one detailed implementation of such a system is illustrated by way of example. In FIG. 1 there is shown the relationship between an orthogonal memory format of the X-Y coordinate type which is used in conventional random access memories such as ferrite core, plated wire, or metal oxide-semiconductor types and the plan position indicator format generated by the antenna sweeping through an azimuth angle $\theta$ for each value of which a range vector R exists. In FIG. 1 an X-Y coordinate grid is superimposed on a sector of a circle formed by the vectors OR-1, the range vector for a value of $\theta$ equal to $\theta$-1, and OR-2, the range vector for a value of $\theta$ equal to $\theta$-2, where O is a common origin for both coordinate systems.

In FIG. 4, there is shown a block diagram of one mechanization of the present invention. In this mechanization input video data in the sequence and rate derived from a PPI or B scan antenna sweep of the types shown in FIGS. 1 and 2 by radar sensor 10a are applied to the input buffer memory 10c through analog-to-digital converter 10b. This data is then transmitted from the buffer memory 10c under the control of a signal from gate 11 to a random access memory 12. Since an orthogonal addressing system is used in random access memory 12 in order that data may be read out from it in a sequential progression under control of signals generated by counter 13, an X and Y input address must be generated and used during the loading period in order to convert the PPI format in which data is transmitted from the input buffer to the orthogonal format used in the random access memory 12 to facilitate readout. It will be understood that the loading and readout of the random access memory 12 is on a time shared basis. Since a flicker-free display is required, readout is also continuous and is such that all of the data is read in 1/30th of a second.

One technique for generating the loading address for the random access memory 12 is to use a read only digital memory. Such a memory, however, is quite costly. A preferred alternative is shown in the block diagram of FIG. 4. This is a hybrid technique whereby radial sweeps are generated in synchronism with the loading of the input data. These sweeps are analog-to-digital converted to provide the memory load addresses. The sweeps are actually a series of analog ramps, the amplitude of which is modulated as a function of the range and azimuth of the input video. The instantaneous sweep amplitude is defined as follows:

X = R sine θ
Y = R cosine θ where:

R is the linear ramp defining range of the element to be loaded, θ is the antenna azimuth measured from an arbitrary zero point which is conveniently taken to lie along the positive Y axis, and X is the horizontal or X address while Y is the vertical or Y address.

In the device illustrated in FIG. 4, the signal from the antenna scan is applied to a terminal 14 which in turn is connected through a first channel to a function generator 15 which, for example, may be either a digital read only memory, as shown, or an analog function generator. In either event, generator 15 generates the trigonometric sine of the value of the azimuthal antenna scan angle θ applied to terminal 14 by conventional read out techniques. The antenna scan angle θ is applied through a second channel to a second digital function generator 16 which similarly generates the cosine of the angle θ. The output of function generator 15 is applied as one input to a digital multiplier 17 which has as its other input a digital ramp signal which is generated by range ramp counter 18 and represents values of range. The output of range ramp counter 18 is also applied to a second digital multiplier 19 which has as its other input the values of cosine θ derived as an output from function generator 16. The range ramp counter 18 is controlled by a gated load clock signal from gate 11 which is applied to it as an input to terminal 20 and which is also applied to the video input buffer 10c. The first input 21 of AND gate 11 is the load gate signal. The second input 22 of AND gate 11 has the loading clock signal applied to it. The output of multiplier 17 is applied to terminal 14b whereas the output of multiplier 19 is applied to terminal 18b of mode selector switch S-M as discussed above.

The output of the multiplier 17 will be seen to be the product $K_x^R$ sine θ (where θ and R are the quantities defined above and $K_x$ is a proportionality constant the value of which is dependent on the particular analog-to-digital converter) which is just the value of the X coordinate of the orthogonal address in which the current bit of video data is to be located. Similarly, the output of multiplier 19 will be seen to be the expression $K_y^R$ cosine θ which is just the value of the Y coordinate of the orthogonal address in the random access memory at which the current bit of video data is to be stored in accordance with the equations set forth above for the PPI mode. These digital values of the Y coordinate of the address are supplied to a terminal 25 whereas the digital value of the X coordinate of the address are applied to a terminal 26 when switch S-M is in the position shown. In the other position of switch S-M video data derived from a B scan sweep mode generates addresses the X components of which are derived from terminal 14, A/D converter 23, and thence directly to terminals 14a and 26, and the Y components of which are derived directly from range ramp counter 18 and thence to terminals 18a and 25. Since both the B scan mode and the memory format are orthogonal as may be seen from FIG. 2, there is no need to use trigonometric function generators 15 and 16 for a coordinate transform as is done in the PPI mode. One need only make a simple zero-offset adjustment to allow for difference of coordinate origin location by starting the read out at the correct point with respect to the display raster.

The electronic equivalent of a double pole double throw switch S-A is shown in the readout position in FIG. 4. In this position switch S-A is deriving read signals from output counter 13 to be applied to random access memory 12. During the loading portion of the multiplex cycle, the switch S-A is in the alternate position so that contact is made with contacts 25 and 26 rather than with contacts 29 and 30, as shown. When the switch is in the loading position so that contact is made with terminals 25 and 26, the address on these terminals is supplied to the random access memory 12 through the switch S-A at the same time that information is transferred from the input buffer memory 10c by virtue of the fact that the load gate signal which is applied to AND gate 11 controlling the input buffer is also used to trigger the range ramp generator 18 which is used in forming the current address as noted below.

When the switch S-A is in the position shown in FIG. 4, the output counter 13 is sequentially generating readout signals which are consistent with the display raster pattern illustrated in FIG. 3. That is to say, the output counter sequentially generates elements which are numbered in increasing order from left to right across each horizontal sweep starting at the left topmost sweep and ending at the right of the bottom sweep. The most significant bit, indicating the raster line, is applied to terminal 29. The least significant bit, indicating the element within a line, is applied to terminal 30.

The flyback time between sweeps within a raster and between rasters may be accommodated in any convenient manner such as by appropriate gating of the output clock signal which is applied over input line 31 from output clock generator 27 to the output counter 13. When the output clock signal triggers the output counter 13 to apply readout signal to the random access memory 12, the signals so read out are applied to a digital-to-analog converter 32, the output of which is in turn applied to the cathode ray tube 33 to modulate the intensity of its electron beam. The sweep signals for the cathode ray tube 33 are generated by a tuned sweep generator 34 which receives synchronizing signals over line 35 from the output counter 13. A feedback signal from sweep generator 34 is applied over line 34a to control a gate at the output of generator 27 in such a manner that no clock signals pass from generator 27 to counter 13 during the flyback or other non-display time of the raster derived by generator 34.

Since a random access memory is used, the address bits can be broken into the X and Y components as discussed above. The resolution of the display on the cathode ray tube 33 is related to the number of bits in the X and Y address components. If $N_x$ equals the number of bits in the X component of the address and $N_y$ equals the number of bits in the Y component of the address, then the resolution of the display in the X direction will be equal to $2^{N_x}$ whereas the resolution of the display in the Y direction will be equal to $2^{N_y}$.

In FIG. 5 there is shown a more detailed diagrammatic illustration of the memory format for a random access memory such as the memory 12 of FIG. 4 in which video data is to be stored in a format compatible with a TV-type raster display. It will be observed that the memory 12 has as its basic units a plurality of random access memory modules which may, for example, each consist of an individual semiconductor wafer or chip. The modules form an X-Y array in horizontal plane and are indicated by the reference characters $M_{1,1}$ and extending along the X direction to module $M_{J,1}$ for the J modules in that row. Similarly, the modules which are here shown as comprising three columns extend from $M_{1,1}$ to $M_{1,K}$ in the Y direction. The module at the opposite corner of the array is, of course, indicated by the reference character $M_{J,K}$ denoting that the array may consist of a group of J times K individual memory modules. For purposes of illustration only the drawings show K having a value of 3 and J having a value of 16. Each of the modules in turn is single bit addressable and is capable of storing N times 1 bits. That is to say, the vertical extension of the module format indicates that it can store information to a depth of N bits completing the three dimensional array. In the particular memory being considered N may, for example, have a value of 1024 bits. The addressing is then achieved for the three bits of input video data for each picture element by applying the three bits of input video data respectively over conductors 40, 41 and 42 as shown in FIGS. 4 and 5. The conductor 42, for example, is connected to selectively feed data to all of the modules in row 1, the conductor 41 is similarly connected to all of the modules in row 2, whereas the conductor 40 is similarly connected to all of the modules in the third row as shown in FIG. 5.

The three bit video information is stored in the type of memory illustrated under control of a 14 bit address signal which is applied as shown in FIGS. 4 and 5 over input conductors 43 and 44. Ten of the address bits are applied over cable 43 and are connected to all of the modules are are considered the least significant bits in the address so that they determine the vertical position within the module. It will thus be seen that since $2^{10}$ equals 1024, the 10 bits are sufficient to define the 1024 bit vertical capacity of each module. The four most significant bits in the address are applied over cable 44 to a module select logic block 51 which, in response to the value of these four bits selects one of the 16 module groups extending in the Y direction as from $M_{1,1}$ to $M_{1,K}$ in the drawing. Thus, any given address signal will determine by its most significant four bits which of the 16 groups of three modules will be selected to receive the currently incoming video data and by its ten least significant bits it will determine at what level in the vertical direction of the modules the storage of currently received video data is to be made. The vertical memory direction corresponds in format to the vertical of the various displays. The actual sequence in which data is stored will, of course, be determined by the address generator selected which in turn is determined by the scan mode of the radar sensor. As was discussed above, these addresses will always be selected so that data is placed into the memory in such a fashion that when read out in direct sequence under the control of counter 13 it will reproduce a correct picture of the image when the image is displayed in orthogonal TV raster format.

The output clock generator 27 which controls output counter 13 is shown in both FIGS. 4 and 5. The output clock generator 27 operates at an oscillator controlled highest necessary frequency. As seen in FIG. 4, its output is gated to the output counter 13 which counts down in a ratio sufficient to accommodate the addressing rate which in both input and output must be compatible with the slow scan input rate. The higher frequency output clock generator 27, however, also provides directly over the cable 24 (FIG. 4) which as seen in FIG. 5 consists of three conductors 24a, 24b and 24c, the high frequency signal to a plurality of output parallel to serial conversion logic units 50.

It will be noted that the output parallel-to-serial conversion logic units are arranged in three channels so that one or more interconnected units receives data from all of the memory modules in the rows extending in the X direction as from $M_{1,1}$ to $M_{J,1}$, $M_{1,2}$ to $M_{J,2}$, or $M_{1,K}$ to $M_{J,K}$, respectively. These three channels are shown as supplying data over conductors 45, 46 and 47 to the digital-to-analog converter 32 which in turn converts the three bits of digital information pertaining to video intensity received at any one instant to an analog signal which is applied to control the intensity of the display beam in the cathode ray tube. The rate at which this data is read out of the converters is controlled by the high frequency signals applied to the converters 50 over conductors 24a, 24b and 24c from the output clock generator 27.

Referring to the three dimensional array of memory modules in FIG. 5, any given horizontal plane through any one of the N vertical bit storage levels will intercept each of the JK modules. The bits stored in that horizontal plane define one eighth of a display line in the orthogonal TV raster and are simultaneously read out from the random access memory to the output parallel to serial conversion logic units. The information for that complete line is thus stored in eight such horizontal addresses. For a display raster having 128 horizontal sweep lines, each of which is to be resolved into 128 elements, eight transfers from the module to the conversion units makes 8 × 16 or 128 horizontal elements of three bits each available for serial readout. Accordingly, the vertical depth of 1024 bits per module accommodates 128 horizontal raster lines. A duplicate memory module may be used to accommodate interlaced TV-type display, if desired.

The conversion system described simplifies the display of a B-scan or PPI format. The B-scan data can be read out directly with only a constant adjustment for origin offset. For a PPI display it is otherwise required to generate radial or arc sweeps for the CRT beam deflection. These complex sweeps require linear deflection amplifiers in order to generate the proper deflection current in the CRT deflection yokes. Such linear amplifiers require considerable power and are large and costly. By using a TV-type raster or other orthogonal sweep, efficient tuned sweep generation techniques can be employed for the CRT beam deflection. This is particularly advantageous if the display is part of a system in which other sensors already requiring TV sweep generation are also displayed.

The conversion of the PPI radar format which is originally in R-$\theta$ coordinates to a TV compatible format which is basically in X-Y coordinates is achieved by means of the coordinate transformation indicated by the equations set forth above. This transformation is mechanized by the generation of the appropriate address changes in transferring data from the input buffer 10c to the random access memory 12. Such a transformation permits simple counters to be used to read the data out of memory 12 for display. Depending upon the details of the display format the counter may be gate controlled as indicated above.

In the PPI mode, one complete range sweep is available in the input buffer for loading. These samples are stored in a range sequential order. Hence, as they are clocked out, the value of the output counter 18 represents the range of that element. By using the azimuth angle of the antenna for that sweep as an input to terminal 14 and analog-to-digital converter 23, the proper X-Y addresses for that sweep can be computed for loading by means of the mechanization of the coordinate transform equations given above. That is to say, when the digitized values of the sine or cosine respectively stored in read only memories 15 and 16 are multiplied by the range value from counter 18, the proper digital X and Y load addresses result. The transfer of the digitized video data from input buffer 10c to random access memory 12 together with the address transformation produces a coordinate transform such that data originally derived in a PPI sequence may be displayed in a TV raster sequence by direct counter readout without losing the original relationship between the elements of data which will normally represent a sector of a terrain map.

What is claimed is:

1. In a system including sensing means for obtaining information by producing discrete video signals as a field of view is cyclically scanned in a first predetermined pattern of successive lines at a first rate and display means for displaying said information in a second predetermined pattern of successive lines at a second rate, a digital scan converter for converting said video signals representing said information from said first pattern at said first rate to said second pattern at said second rate, comprising:
   a. means for converting said video signals into elements of digital data;
   b. buffer storage means for receiving and storing said elements of digital data at addresses corresponding to said first pattern;
   c. random access storage means for receiving data from said buffer storage means;
   d. address generating means connected to generate as a function of said first pattern at said first rate addresses to position said data in said random access storage means in positions corresponding to said second pattern, said function representing the conversion relationship between said first and second patterns;
   e. means to synchronize said address generating means with said means for producing said discrete video signals and for transferring said signals into said buffer storage means and thence into said random access storage means; and
   f. counter means connected to provide sequential readout signals to said random access storage means to sequentially read bits of data in said storage means for presentation by said display means, said counter means also being operatively connected to synchronize a sweep generator means for said display means which receives and presents said data.

2. A system as in claim 1 wherein said address generating means is connected to generate at said first rate addresses as a function of the said first pattern which is a radar-type sector plan position indicator scan and position said data in said random access storage means in positions corresponding to a second pattern which is a horizontal standard television raster.

3. A system as in claim 1 wherein said address generating means is connected to generate at said first rate addresses as a function of a first pattern which is a radar-type B-scan having azimuth and range as orthogonal coordinates and position said data in said random access storage means in positions corresponding to a second pattern which is a horizontal standard television raster.

4. A system as in claim 1 wherein said random access storage means comprises a random access metal-oxide semiconductor memory.

5. A system as in claim 2 wherein said address generating means comprises:
   a. a range ramp counter for providing a digital signal representing the range of a given element of video data;
   b. digital read-only memory means for storing values of the trigonometric sine and cosine of azimuth angles;
   c. a pair of digital multipliers, one of said multipliers being connected to multiply the output of said range ramp counter by the sine of said azimuth angle to generate the X component of the address for said random access memory and the other of said multipliers being connected to multiply the output of said range ramp counter by the cosine of said azimuth angle to generate the Y component of said address for said random access memory.

6. A system as in claim 3 wherein first circuit means are provided to utilize digital values of said azimuth angle as the X component of the address in said random access memory and second circuit means are provided to utilize the output of said digital range ramp counter as the Y component of said address for said random access memory.

7. Apparatus as in claim 5 wherein said range ramp counter is triggered by the output of an AND gate which controls the transfer of video information from said input buffer to said random access memory, one input to said AND gate being a load gate signal and the other input to said AND gate being a load clock signal.

8. In a digital scan converter for converting video data available of a first scan pattern to video data for display in a second scan pattern, the improvement comprising:
   a. random access memory means for receiving said available video data in digitalized form;
   b. address generating means connected to generate as a function of said first scan pattern addresses to position said video data in said random access storage means in positions corresponding to the sequential read out order of said second scan pattern, said function representing the conversion relationship between said first and second patterns;
   c. means to read said digitalized video data into said random access memory means synchronously with the generation of said addresses and at the positions designated by said addresses; and
   d. counter means connected to provide sequential readout signals to said random access memory means to sequentially read said video data stored at said addresses for display.

* * * * *